Nov. 5, 1968    P. H. FOOTE, JR    3,409,337
SEALED ROLLER BEARING
Filed July 5, 1966

INVENTOR
PHILIP H. FOOTE, JR.

BY Mason, Porter, Diller & Brown
ATTORNEYS

United States Patent Office 3,409,337
Patented Nov. 5, 1968

3,409,337
SEALED ROLLER BEARING
Philip H. Foote, Jr., Hollywood, Calif., assignor to The Torrington Company, Torrington, Conn., a corporation of Maine
Filed July 5, 1966, Ser. No. 562,878
9 Claims. (Cl. 308—187.2)

ABSTRACT OF THE DISCLOSURE

There is disclosed a needle-bearing assembly of the drawn cup type having a cup body providing an outer race, rollers, and a cup lip extending radially inwardly of the cup body at an end thereof, there being a cup flange, positioned internally of the cup body and located axially between the radial cup lip and an adjacent end of the rollers, a seal positioned radially inwardly of a first cylindrical portion of the flange which contacts the inner wall of the cup body and is engaged in end edge abutment against the radial cup lip and positioned axially between and engaging with the radial cup lip and a second portion of the flange spaced axially from and paralleling the radial cup lip, the seal having radially inwardly depending means thereon defined in part by an endwise opening groove in the seal and disposed for seal contacting engagement with a cooperating shaft.

---

This application relates in general to new and useful improvements in the roller bearing art, and more particularly relates to bearing assemblies having seals adapted to effect a seal with a cooperating shaft.

Accordingly, it is the primary object of this invention to provide a novel bearing assembly including a seal and flange combination which performs the dual function of retaining the bearing rollers in a bearing cup prior to the installation of the assembly between a rotating shaft and housing, and forms an effective seal about the shaft after installation.

It is another object of this invention to provide a novel seal and flange combination in a bearing assembly, the seal being interchangeable and having a peripheral sealing leg which may be directed either axially inwardly or axially outwardly relative to a bearing cup.

It is still another object of this invention to provide a bearing assembly including a bearing cup, a plurality of rollers in the cup, and a movable flange inwardly of the bearing cup adjacent one end of the rollers which cooperates with an inturned lip at an opposite end of the cup to guidingly engage ends of the rollers.

With the above and other objects in view that will hereinafter appear, the nature of the invention will be more clearly understood by reference to the following description, the appended claims, and the several views illustrated in the accompanying drawing.

Figure 1:
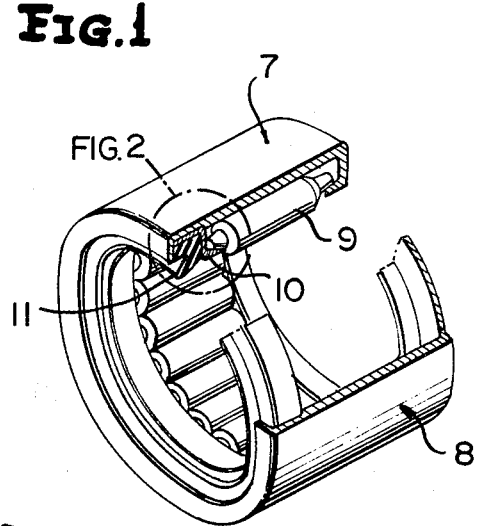
FIGURE 1 is a perspective view of the bearing assembly of this invention, having portions omitted for clarity, and illustrates a seal and flange combination housed in a bearing cup of the bearing assembly.

Referring now to the drawing in detail, reference is first made to FIGURE 1 wherein there is illustrated a bearing assembly 7 of this invention, including a drawn cup 8, a plurality of rollers 9, a flange 10 and a seal 11. The drawn cup 8 includes a cup body 12, a cup lip 13 extending radially inwardly of the cup body, and a cup end 14 having a radially extending cup end portion 15 and an axially extending cup lip portion 16. The lip portion 16 is tapered at 17 to cooperate with an adjacent end 18 of each of the rollers 9, though such is not essential to the present invention.

The cup 12 is of such a length as to permit insertion of the seal 11 and flange 10 between the radially directed cup lip 13 and end 20 of rollers 9.

Figure 2:
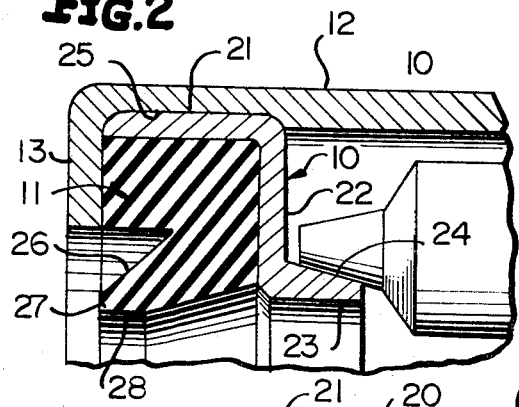
FIGURE 2 is an enlarged fragmentary cross-sectional view of a portion of the bearing assembly of FIGURE 1, and illustrates the manner in which the seal of this invention is retained between an adjacent bearing cup lip and the flange and the manner in which an axially directed flange lip retains a roller in the bearing cup.

Referring now to FIGURE 2, there is shown more clearly the disposition of the seal 11 and the flange 10 adjacent the radially directed cup lip 13. The flange 10 is shown to include a first axially extending flange portion 21, a second radially extending flange portion 22 and a spaced axially extending lip portion 23. Flange lip portion 23 has an inside taper 24 for cooperation with the end 20 of each of the rollers 9, although the taper 24 is not essential to the present invention. An annular groove 25 may be provided in the inner surface or race of the cup body 12 to partially receive the first axially extending flange portion 21. The flange portion 21 may be rigidly secured in the groove 25, or slidable relative to the cup body 12, as desired.

Figure 3:
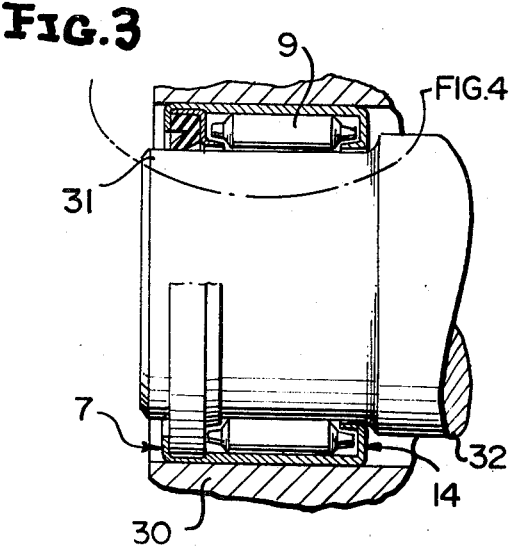
FIGURE 3 is a fragmentary axial cross-sectional view of a housing, a shaft, and the bearing assembly of this invention, portions of which are shown in elevation, and illustrates the operative relationship of the bearing components.
Figure 4:
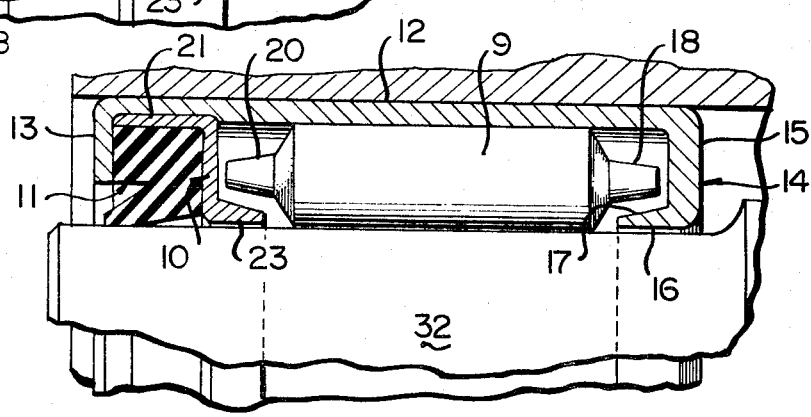
FIGURE 4 is an enlarged fragmentary cross-sectional view of a portion of the bearing assembly of FIGURE 3, and more clearly illustrates the inter-relation of the bearing cup, a roller, the flange, and the seal with the shaft and housing.

In its preferred embodiment, the seal 11 has on its axial outermost surface an annular V-shaped groove 26 defining a depending leg 27 having an inner peripheral surface 28 adapted for contacting engagement with a shaft 32 (FIGURES 3 and 4).

Figure 5:
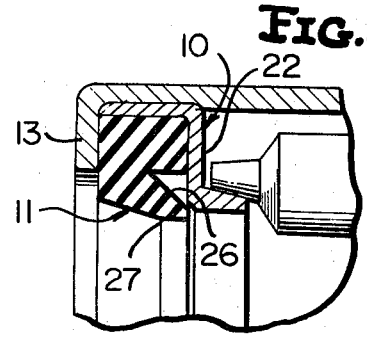
FIGURE 5 is an enlarged fragmentary cross-sectional view, similar to that of FIGURE 2, but illustrating an alternative arrangement of the seal of this invention.

FIGURE 5 discloses an alternative arrangement of the seal 11 between the radially directed cup lip 13 and the flange 10, whereby the annular groove 26 is located at the interior surface of the seal 11 adjacent the second radially extending flange portion 22, thereby permitting groove 26 adjacent the seal leg 27 to open from the opposite direction of that shown in FIGURE 2.

FIGURE 3 shows a typical example of the manner in which the bearing assembly 7 of this invention would be utilized. The assembly 7 is positioned within a housing 30 and receives a reduced diameter portion 31 of the shaft 32. The reduced diameter portion 31 engages the rollers 9 in the usual manner of a full complement roller bearing. However, spaced rollers may also be used with to the cup body 12, as desired.

In the preferred form of this invention, the seal 11 is retained adjacent the flange 10 by means of its own inherent resilience, being constructed of rubber or other such material. However, the seal 11 may also be bonded to the flange 10 by a vulcanizing or similar process.

It should also be noted that while the ends 18, 20 of the rollers 9 are spaced from the lip portions 16, 23, respectively, during the operation of the bearing assembly, in case of close tolerances the roller ends could contact the respective lip portions and be guided thereby.

Although only preferred embodiments of the invention have been described and illustrated herein, it is to be understood that minor modifications may be made in the bearing and in its application within the spirit and scope of the invention, as defined in the appended claims.

I claim:
1. In a needle-bearing assembly of the drawn cup type having a cup body providing an outer race, rollers and a cup lip extending radially inwardly of said cup body at an end thereof; the improvement comprising a cup flange positioned internally of the cup body and located axially between said radial cup lip and an adjacent end of said rollers, a seal positioned radially inwardly of a first cylindrical portion of said flange which contacts the inner wall of the cup body and is engaged in end edge abutment against said radial cup lip and positioned axially between and engaging with said radial cup lip and a second portion of said flange spaced axially from and paralleling said radial cup lip, said seal having radially inwardly depending means thereon disposed for seal contacting engagement with a cooperating shaft.

2. The combination of claim 1 wherein said seal has an annular groove in its axial outermost surface, defining a depending annular leg constituting said inwardly depending means and disposed for providing means for exerting sealing force radially of said shaft.

3. The combination of claim 1 wherein said seal has an annular groove in its axial innermost surface, defining a depending annular leg constituting said inwardly depending means and disposed for providing means for exerting sealing force radially of said shaft.

4. The combination of claim 1 wherein an annular groove means is provided in the inner surface of said cup body for partially receiving said first cylindrical portion of said flange.

5. The combination of claim 1 wherein said seal is bonded to said flange at said first and second portions thereof.

6. The combination of claim 1 wherein said first cylindrical portion of said flange is positioned within said cup body in movable unattached relation.

7. In a needle-bearing assembly of the drawn cup type having a cup body providing an outer race, rollers and a cup lip extending radially inwardly of said cup body at an end thereof; the improvement comprising a cup flange positioned internally of the cup body and located axially between said radial cup lip and an adjacent end of said rollers, a seal positioned radially inwardly of a first portion of said flange and positioned axially between said radial cup lip and a second portion of said flange, said seal having radially inwardly depending means thereon for contacting engagement with a cooperating shaft, said flange including an axially directed annular lip portion positioned in spaced radial relation to said cup body and extending toward a cup end adjacent on opposite end of said rollers; said cup end having a radially inwardly directed annular end portion and an axially directed lip portion extending toward said flange axially directed lip portion; said axially directed lip portions defining therebetween with the bearing race of said cup body means for guiding said bearing rollers.

8. The combination of claim 7 wherein said axially directed lips are tapered to provide cooperating guidance means with adjacent roller ends.

9. The combination of claim 8 wherein said needle-bearing assembly is of the full complement type.

References Cited

UNITED STATES PATENTS

| | | | |
|---|---|---|---|
| 2,015,198 | 9/1935 | Smellie | 308—187.2 |
| 2,747,949 | 5/1956 | Smith | 308—187.2 |
| 2,866,670 | 12/1958 | Harris et al. | 308—187.1 |
| 2,982,999 | 5/1961 | Stewart | 308—187.2 X |
| 3,206,829 | 9/1965 | Schaeffler et al. | 308—187.1 X |
| 3,306,682 | 2/1967 | Cowles | 308—187.2 |
| 3,348,889 | 10/1967 | Schaeffler et al. | 308—187.2 |

FOREIGN PATENTS

| | | |
|---|---|---|
| 1,379,769 | 10/1964 | France. |

MARTIN P. SCHWADRON, *Primary Examiner.*

CARROLL B. DORITY, *Assistant Examiner.*